US009360135B1

(12) United States Patent
McClure

(10) Patent No.: US 9,360,135 B1
(45) Date of Patent: Jun. 7, 2016

(54) SUBSEA CLAMP FOR HOSES AND CONTROL LINES

(71) Applicant: Lawrence M McClure, Katy, TX (US)

(72) Inventor: Lawrence M McClure, Katy, TX (US)

(73) Assignee: International Champs Inc., Richmond, TX (US)

( * ) Notice: Subject to any disclaimer, the term of this patent is extended or adjusted under 35 U.S.C. 154(b) by 26 days.

(21) Appl. No.: 14/465,927

(22) Filed: Aug. 22, 2014

Related U.S. Application Data

(62) Division of application No. 13/790,368, filed on Mar. 8, 2013, now abandoned, which is a division of application No. 12/927,821, filed on Nov. 24, 2010, now Pat. No. 8,464,986, which is a division of application No. 11/985,412, filed on Nov. 15, 2007, now Pat. No. 7,861,982.

(60) Provisional application No. 60/859,333, filed on Nov. 16, 2006.

(51) Int. Cl.
*A47B 96/06* (2006.01)
*F16L 3/10* (2006.01)
*E21B 19/02* (2006.01)
*F16L 1/12* (2006.01)
*F16L 3/08* (2006.01)
*E21B 17/10* (2006.01)

(52) U.S. Cl.
CPC ........... *F16L 3/1025* (2013.01); *E21B 17/1035* (2013.01); *E21B 19/02* (2013.01); *F16L 1/123* (2013.01); *F16L 3/08* (2013.01)

(58) Field of Classification Search
CPC .... F16L 3/1075; F16L 3/085; E21B 17/1035; E21B 19/02
USPC ............ 248/74.1, 74.4, 230.4, 230.6, 229.14, 248/229.13, 231.71, 62, 65, 68.1, 73, 49, 248/63, 316.5, 229.1, 229.2, 229.23, 228.1, 248/228.4, 230.1, 231.51
See application file for complete search history.

(56) References Cited

U.S. PATENT DOCUMENTS

| | | | | |
|---|---|---|---|---|
| 6,431,502 | B1 * | 8/2002 | Goodman | ........... E21B 17/1035 248/229.14 |
| 6,799,607 | B1 * | 10/2004 | Friedline | ................. F16L 3/085 138/106 |
| 7,614,593 | B2 * | 11/2009 | McClure | ............. E21B 17/1035 248/229.14 |
| 7,861,982 | B1 * | 1/2011 | McClure | ............... F16L 3/1075 248/229.14 |
| 8,464,986 | B1 * | 6/2013 | McClure | ............... F16L 3/1075 248/229.13 |

\* cited by examiner

*Primary Examiner* — Todd M Epps
(74) *Attorney, Agent, or Firm* — John R Casperson

(57) ABSTRACT

A clamp for a tubular hose or cable is disclosed. The clamp comprises a first clamp half, a second clamp half, and a hinge pin. The first clamp half has a first end and a second end and defines a first concave semi-cylindrical face. The first end of the first clamp half carries means for mounting the clamp. The second clamp half has a first end and a second end and defines a second concave semi-cylindrical face. The first clamp half and the second clamp half come together along a parting line and are retained together by a hinge pin. The clamp halves are provided with snap-in liners for easy use. Alternative mounts for mounting the clamp on subsea wire line or tubulars is also disclosed.

3 Claims, 11 Drawing Sheets

SUBSEA CLAMP FOR HOSES AND CONTROL LINES

CROSS REFERENCES TO RELATED APPLICATIONS

This application is a division of application Ser. No. 13/790,368, filed 8 Mar. 2013, now abandoned, which was a division of application Ser. No. 12/927,821, filed 24 Nov. 2010, now U.S. Pat. No. 8,464,986, issued Jun. 18, 2013, which was is a division of application Ser. No. 11/985,412, filed 11 Nov. 2007, now U.S. Pat. No. 7,861,982, issued Jan. 4, 2011, which claimed the benefit of U.S. Provisional Application No. 60/859,333 filed Nov. 16, 2006, the disclosure of which is herein incorporated by reference.

FIELD OF THE INVENTION

This invention relates to a clamp for securing hoses and control lines to a subsea riser structure.

BACKGROUND OF THE INVENTION

Subsea clamps for use in the offshore oil and gas industries have to be durable and rugged to withstand the rigors of use. They also have to be reliable in their function, because repairs in the subsea environment are difficult and expensive. It is also desirable that the clamps have few loose parts, because they are handled in an area where dropped parts can be lost overboard. It is further desirable that the clamps be padded, so as to reduce the risk of damaging the hoses and control lines secured by them.

OBJECTS OF THE INVENTION

It is an object of the invention to provide a clamp which is well suited for subsea use in the oil and gas industry.

SUMMARY OF THE INVENTION

In one embodiment of the invention, there is provided a clamp for a tubular hose or cable. The clamp comprises a first clamp half, a second clamp half, and a hinge pin. The first clamp half has a first end and a second end and defines a first concave semi-cylindrical face. The first end of the first clamp half carries means for mounting the clamp. The second clamp half has a first end and a second end and defines a second concave semi-cylindrical face. The first clamp half and the second clamp half come together along a parting line. The first clamp half defines at least one hinge pin hole at a position between the first end and the semi-cylindrical face. The second clamp half defines a hinge pin hole at a position near the first end. A hinge pin is positioned through the hinge pin holes of the first clamp half and the second clamp half and pivotally connects the clamp halves so that the clamp halves come together in a face to face relationship to form a clamp assembly which defines at least one central passage therethrough for clamping a cylindrical object. The central passage has a longitudinal axis which is parallel to a longitudinal axis of the hinge pin.

Another embodiment of the invention provides an elastomeric liner half for a hinged hose or cable clamp. The liner half is formed from an elastomeric material and defines an inside surface defining at least one semi-cylindrical trough having a longitudinal axis, a first end, and a second end, for closely receiving a hose or cable to be clamped and an outside surface to be to be closely received by an inside surface of a clamp half. The liner half has a generally semi-cylindrical outer surface with at least one tang protruding therefrom for locating the liner half in the clamp.

Another embodiment of the invention provides a mounting structure which can be used to mount a clamp to a cylindrical object, such as a pipe. The structure comprises a base plate, a hollow post, and a pair of spaced apart walls. The base plate has a first face and a second face. The hollow post extends normally from the first face. The pair of parallel spaced apart walls extends normally from the second face. Each wall has a first end attached to the base plate and a second end spaced apart from the base plate. The second end of each wall defines an identical concave hyperbolic saddle to provide two short-line contacts on a range of different diameter pipes.

DETAILED DESCRIPTION OF THE INVENTION

Figure 1:
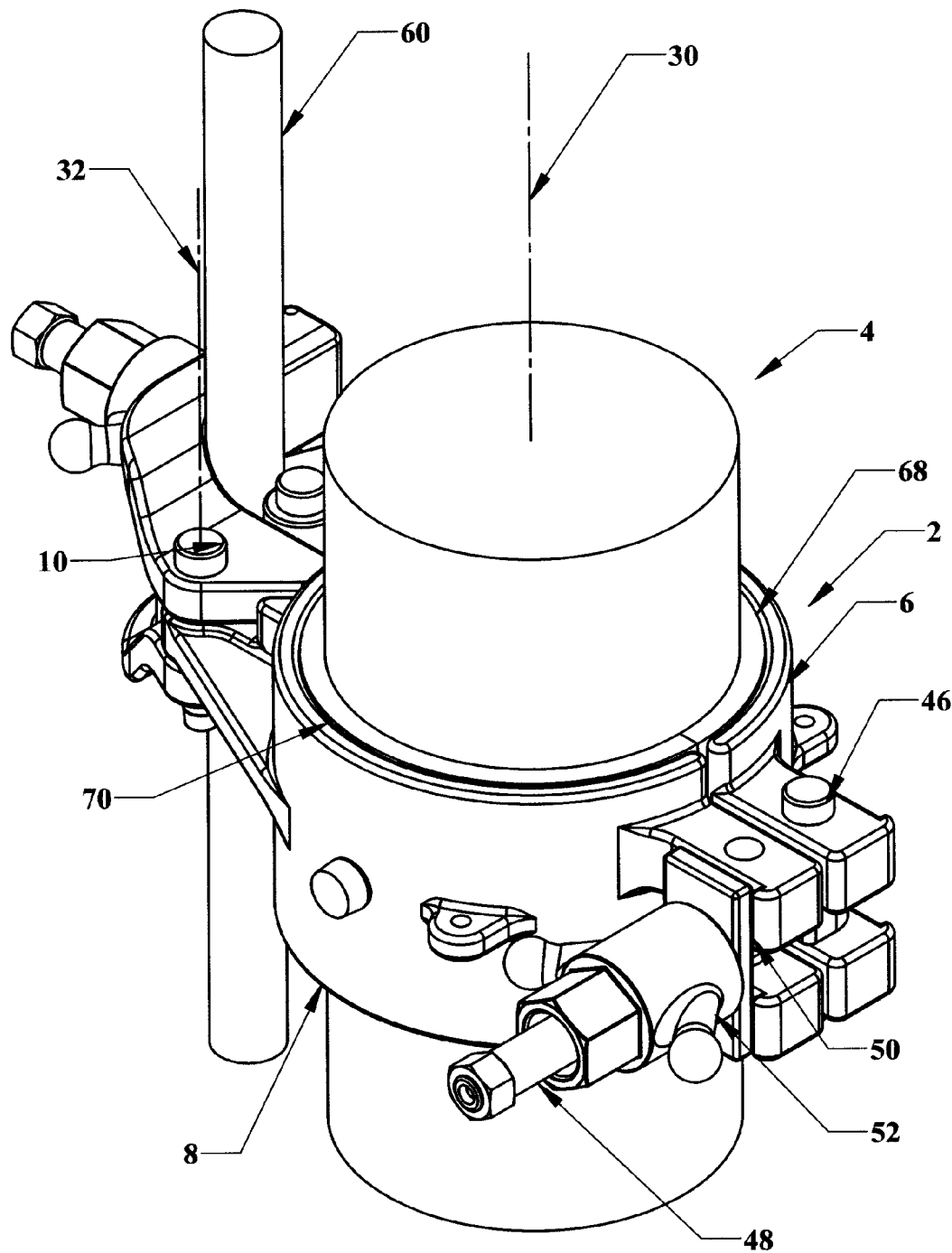
FIG. 1 is a pictorial illustration, partly in schematic, illustrating one embodiment of the present invention.

With reference to FIGS. 1-6 and 9, one embodiment of the invention provides a clamp 2 for a tubular hose or cable 4. The clamp comprises a first clamp half 6, a second clamp half 8, and a hinge pin 10.

Figure 7:
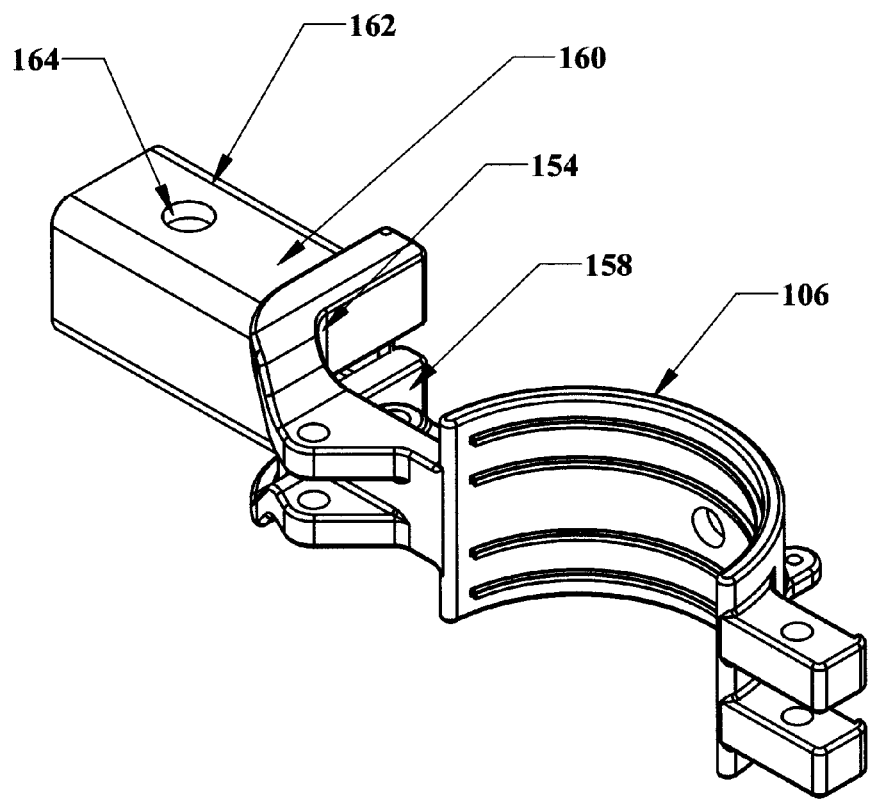
FIG. 7 is a pictorial representation showing a modified form of the portion of the device shown in FIG. 4.
Figure 8:
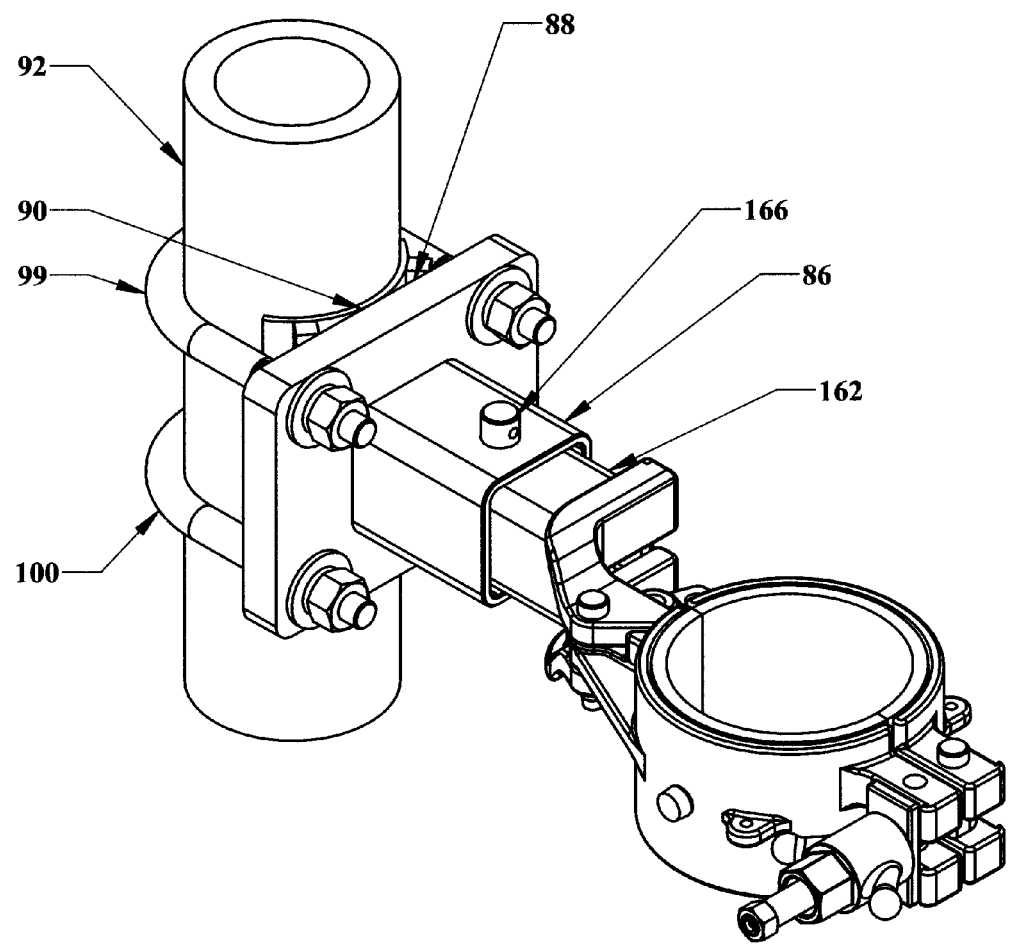
FIG. 8 is a pictorial representation of another embodiment of the invention, which employs the modified element shown in FIG. 7.
Figure 9:
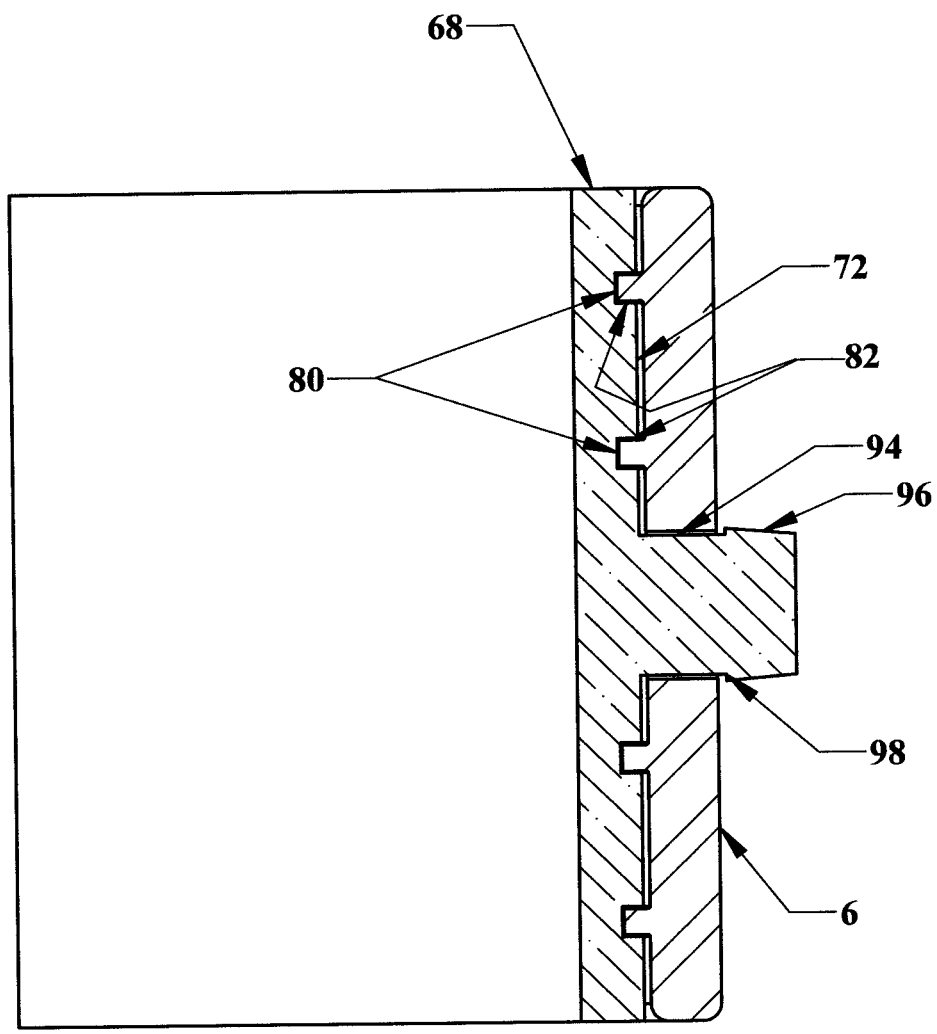
FIG. 9 is a side sectional view of a portion of the device shown in FIG. 2, along cut lines 9-9.
Figure 10:
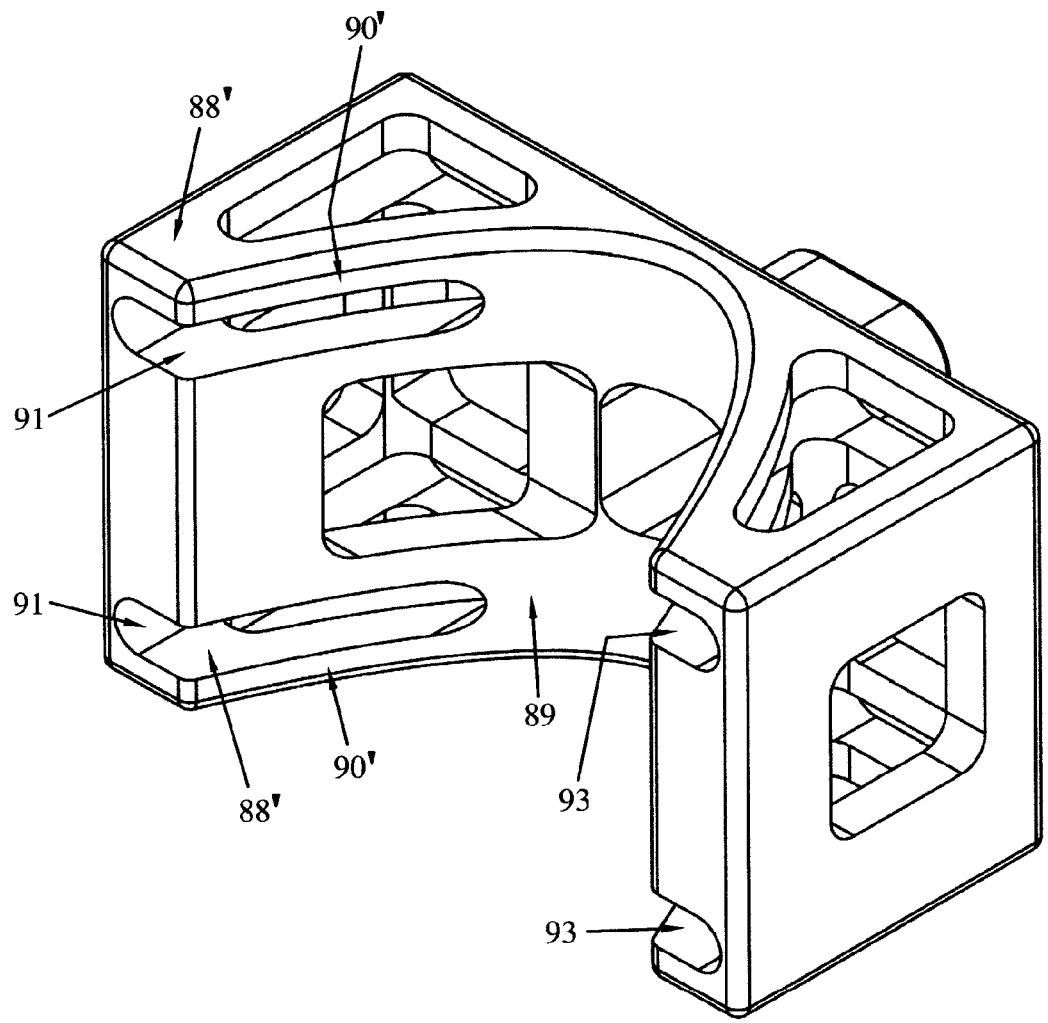
FIG. 10 is a pictorial representation of a modified mounting element which can be employed in the manner of FIG. 8.
Figure 11:
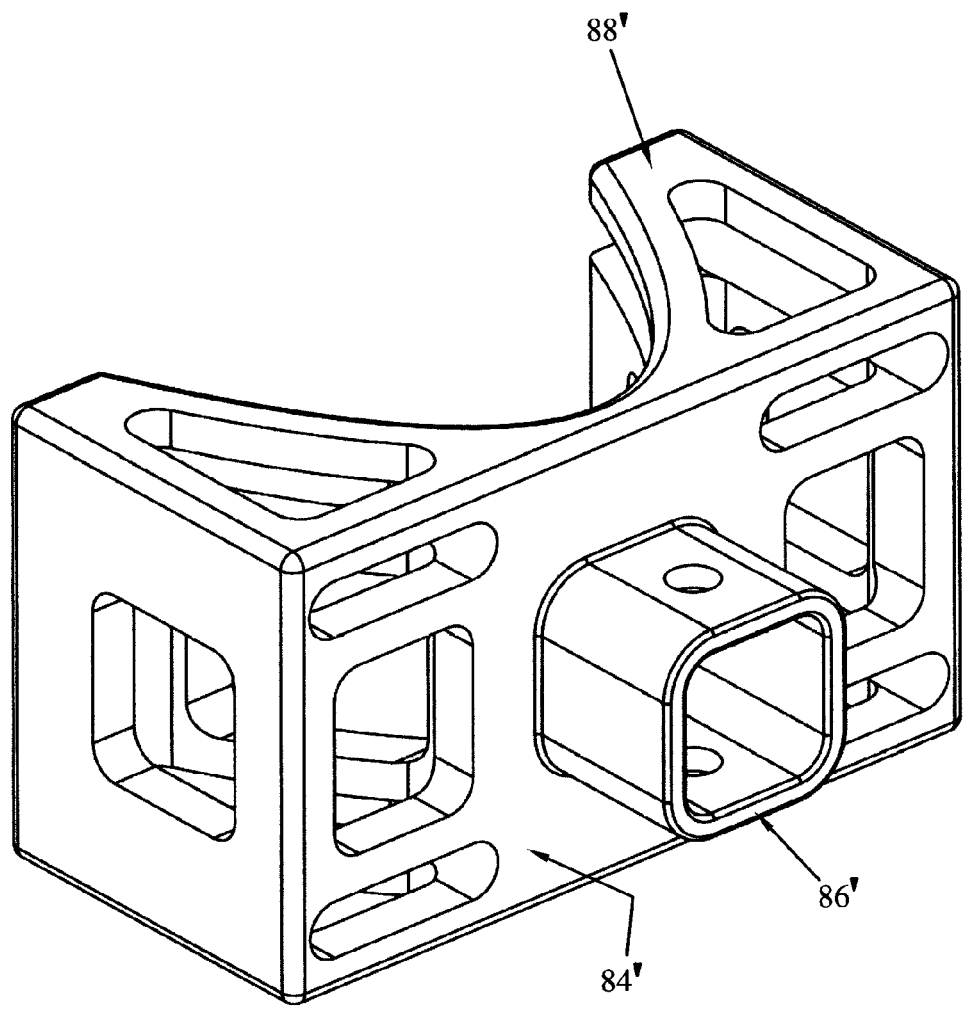
FIG. 11 is a pictorial representation of the mounting element shown in FIG. 10 from another perspective.

The first clamp half has a first end 12 and a second end 14 and defines a first concave semi-cylindrical face 16. Preferably, the semi-cylindrical face forms about half of an inner cylindrical face. The first end of the first clamp half carries means 18 for mounting the clamp. FIGS. 7-8 show an alternative design wherein a first clamp half 106 carries a means 118 for mounting the clamp. FIGS. 10-11 show an alternative design for a portion of the means 118.

The second clamp half has a first end 20 and a second end 22 and defines a second concave semi-cylindrical face 24. Preferably, the semi-cylindrical face forms about half of an inside cylindrical face. The first clamp half and the second clamp half come together along a parting line, it being understood that the parting "line" is actually a plane. The faces of the two clamp halves are preferably mirror images of each other. The first clamp half defines at least one, preferably a pair of, hinge pin holes 26 at a position between the first end and the semi-cylindrical face. The second clamp half defines at least one hinge pin hole 28 at a position near the first end.

The hinge pin is positioned through the hinge pin holes of the first clamp half and the second clamp half and pivotally connects the clamp halves so that the clamp halves come together in a face to face relationship to form a clamp assembly which defines at least one passage therethrough for clamping a cylindrical object. The passage has a longitudinal axis 30 which is parallel to a longitudinal axis 32 of the hinge pin. Preferably, the at least one passage is a single passage defined by a generally cylindrical inside surface formed by the assembly of the two clamp halves.

The second end of the first clamp half is defined by a first pair of spaced apart ears 34, 36.

The second end of the second clamp half is defined by a second pair of spaced apart ears 38, 40. The ears of a pair are preferably longitudinally spaced from each other, with respect to the central axis of the clamp. The second pair of spaced apart ears is in juxtaposition with the first pair of ears when the clamp is in a closed position, as illustrated in FIG. 1. The pairs of ears are preferably spaced a small distance from each other, to allow for take-up as the clamp is latched. The first pair of ears further defines a pair of hinge pin holes 42, 44. Preferably, one hole is in each ear and the holes are longitudinally aligned with respect to the central axis of the clamp. A second hinge pin 46 (see FIG. 1) is positioned through the pair of hinge pin holes in the first pair of ears. A locking bolt 48 (see FIG. 2) is provided having a first end and a second end, with an aperture near the first end, and a threaded second end. The second hinge pin passes through the aperture so that the locking bolt can swing from a first position in which the clamp can be opened (FIG. 2) to a second position in which the clamp can be latched. (FIG. 1). The locking bolt preferably swings in a plane which is normal to the central axis of the clamp. The locking bolt preferably swings into position between the second pair of ears for latching.

The second pair of ears defines a pair of contoured surfaces 148 facing away from the first pair of ears, when the clamp in a closed position. See FIG. 5. A latch element 50 (FIG. 1) is slidably carried by the locking bolt and has a shape for close receipt by the contoured surfaces. A nut 52 is threadably mounted on the threaded end of the locking bolt for urging the latch element against the contoured surfaces and locking the clamp in the closed position.

Figure 2:
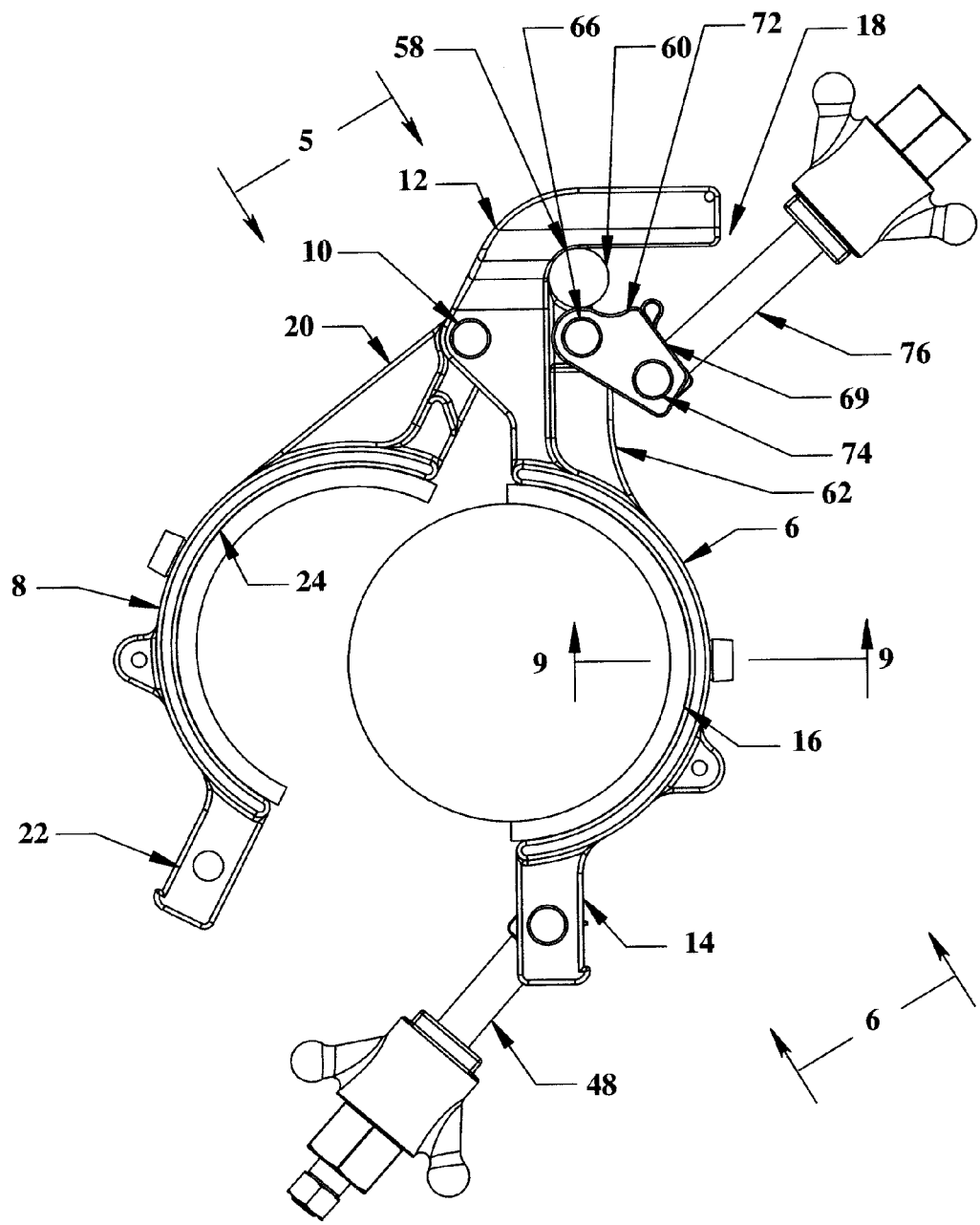
FIG. 2 is a top view of the clamp in FIG. 1, illustrating movement of the parts.
Figure 3:
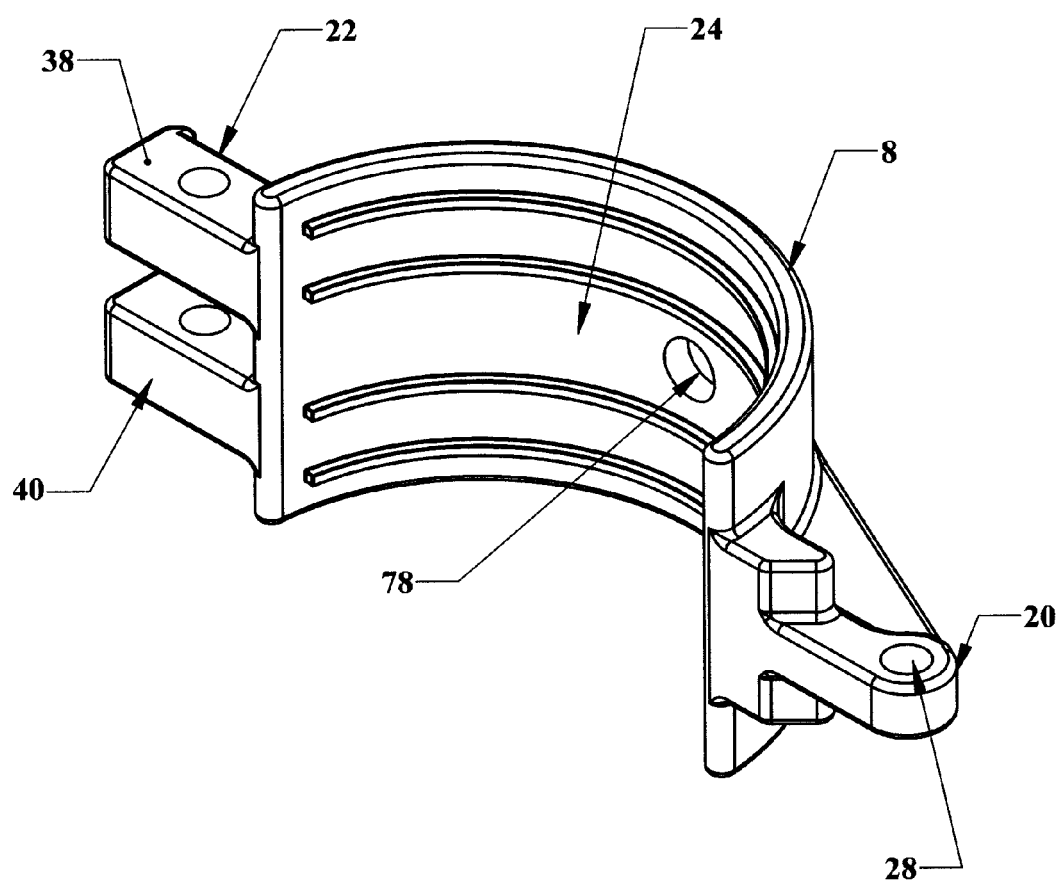
FIG. 3 is a pictorial illustration of a portion of the device in FIG. 1.
Figure 4:
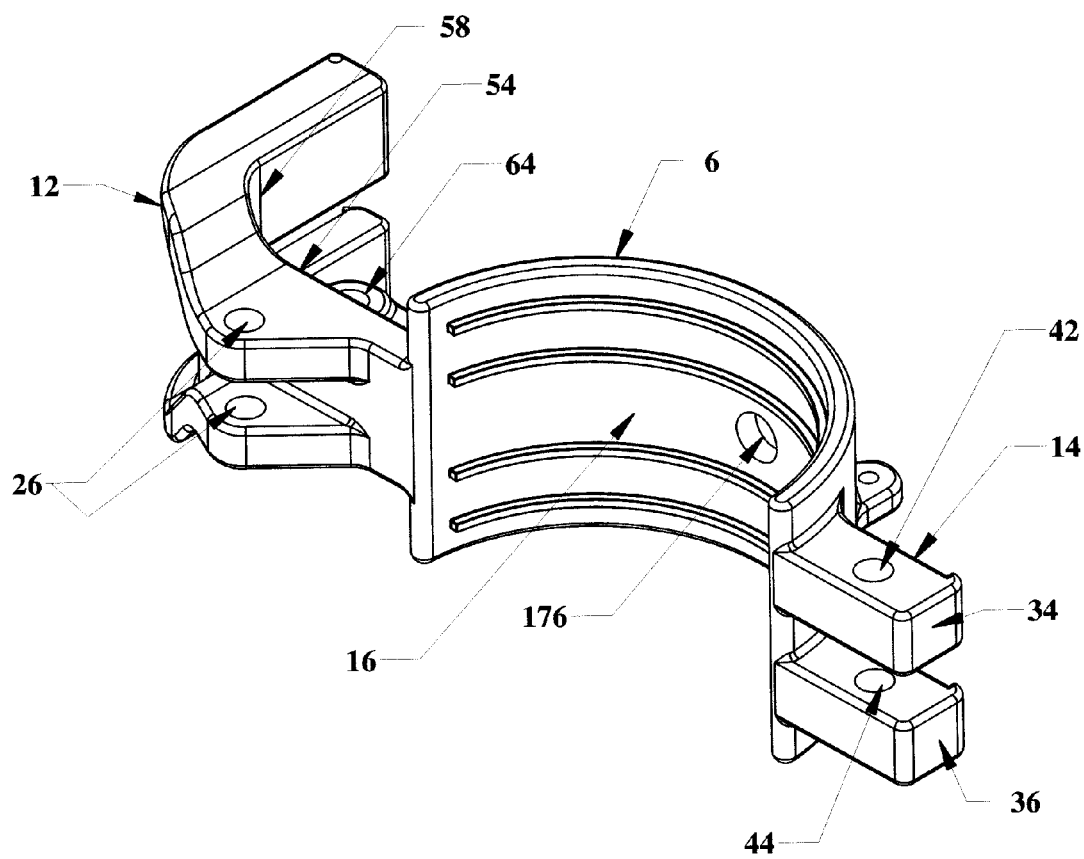
FIG. 4 is a pictorial illustration of another portion of the device in FIG. 1.
Figure 5:
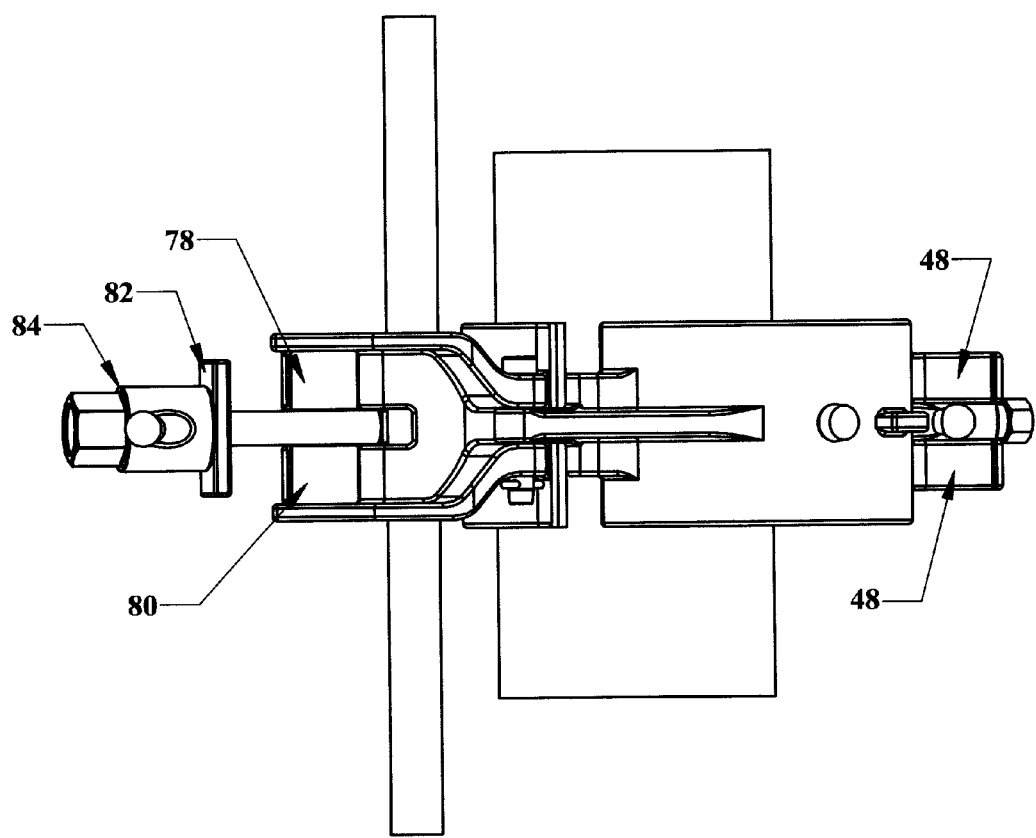
FIG. 5 is a side view of the apparatus in FIG. 2, along perspective line 5.
Figure 6:
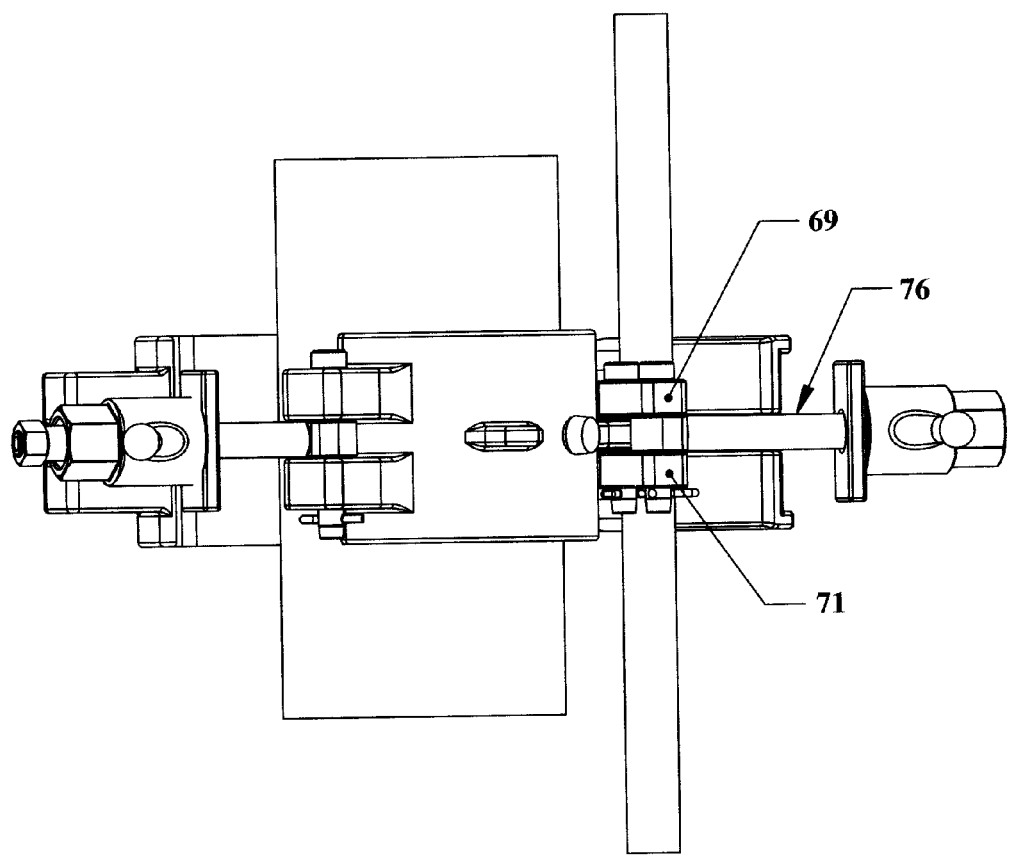
FIG. 6 is a side view of the apparatus in FIG. 2 along perspective line 6.

The first end of the first clamp half forms a pair of spaced apart elbows 54, 58 (See FIG. 4) extending generally transversely away from the parting line in a direction generally away from the second clamp half (See FIG. 2). Preferably, the elbow outer end sections extend generally normal to the parting plane of the clamp. Preferably, the elbow end sections are generally parallel to each other. The inner side of each of the elbows is contoured to clamp a side of a cable 60. The first clamp half further defining a rib 62 on an outer surface thereof extending toward the second end of the clamp between the elbows and defining an aperture 64 (See FIG. 4) near the elbows. A hinge pin 66 is positioned through the aperture defined by the rib. The rib preferably protrudes in a plane normal to the axis of the clamp and the pin is parallel to the axis of the clamp.

A pair of hinge plates 69, 71 (FIG. 6) is provided, each having a first end and a second end and an aperture near the first end and an aperture near the second end. The pair of hinge plates is attached by the apertures near their first ends to the hinge pin positioned through the aperture defined by the rib. The hinge pin passes through the apertures. Each of the hinge plates has a side surface 72 near its first end facing the elbow and contoured to clamp a side of the cable. A third hinge pin 74 is positioned through the pair of hinge pin holes in second end of the pair of hinge plates. The third hinge pin is preferably parallel to the axis of the clamp.

A second locking bolt 76 is provided having a first end and a second end, with an aperture near the first end, and a threaded second end. The first end of the second locking bolt is positioned between the hinge plates. The third hinge pin passes through the aperture. The locking bolt swings from a first position in which the clamp can be disconnected from a cable (FIG. 2) to a second position in which the clamp can be latched to the cable (FIG. 1). The locking bolt preferably swings in a plane normal to the axis of the clamp.

The pair of elbows defines a pair of contoured surfaces 78, 80 facing away from the pair of hinge plates. See FIG. 5. A second latch element 82 is slidably carried by the second locking bolt. The second latch element has a shape for close receipt by the pair of contoured surfaces. A second nut 84 is threadably mounted on the locking bolt for urging the second latch element against the contoured surfaces and latching the clamp to the cable. The structure mounted to the pin 66 thus forms a type of toggle clamp for mounting the clamp to a cable.

In another embodiment of the invention, the first end of the first clamp half forms a pair of spaced apart elbows 154, 158 extending generally transversely from the parting line and in a direction generally away from the second clamp half 106. See FIG. 7. An inner side of each of the elbows is contoured to clamp a side of a cable. A boss 160 extends transversely from the elbows in a direction generally along or parallel to the parting line, and in a plane which is normal to the longitudinal axis between the clamp halves. The boss has an outer surface contoured to be received within a hollow extension leg, and a hollow extension leg 162 is mounted on the boss. The hollow extension leg has a pair of apertures 164 therethrough for receipt of a pin 166. See FIG. 8. The hollow extension leg can be welded to the boss.

In use, the clamp further comprises an elastomeric liner which lines the least one passage through the clamp assembly for clamping a at least one cylindrical object. The elastomeric liner comprises a pair of liner halves 68, 70 positioned in face to face relationship, each liner half defining at least one trough, one liner half in each clamp half. Each passage through the clamp assembly is defined by a pair of facing troughs from facing liner halves.

Each liner half has a generally semi-cylindrical outer surface 72 with at least one tang protruding therefrom for locating the liner half in the clamp half. See FIG. 9. By semi-cylindrical outer surface is meant half of a cylindrical outer surface. Each clamp half has an aperture 176 or 78, for receiving the tang. See FIGS. 3 and 4.

The generally semi-cylindrical outer surface of the liner half defines a plurality of generally circumferentially extending grooves 80 for accepting circumferentially extending ridges 82 on an inner surface of the clamp half. Each clamp half has circumferentially extending ridges protruding from the concave semi-cylindrical face which are received by the grooves in the liner half. The ridges and grooves are preferably rectangular in cross section.

FIG. 8 shows a mounting means for the clamp in accordance with one embodiment of the invention. The means comprises a base plate 84, 84' (See FIGS. 10 and 11) having a first face and a second face. A hollow post 86, 86' extends normally from the first face. A pair of parallel spaced apart walls 88, 88' extend normally from the second face. Each of the parallel spaced apart walls has a first end attached to the base plate and a second end spaced apart from the base plate. The second end of each wall defines an identical concave hyperbolic saddle 90, 90' to provide two short-line contact areas on a range of different diameter pipes, for example, pipe 92. The hollow post 86 or 86' is mounted on the extension leg 162 so that the pair of parallel spaced apart walls are normal to the longitudinal axis of the semi-cylindrical trough.

The hollow post defines a pair of aligned apertures which are aligned with the pair of apertures through the hollow extension leg. The pin 166 is positioned through the aligned apertures to retain the hollow post in position on the extension leg.

Another embodiment of the invention provides an elastomeric liner half for a hinged hose or cable clamp. The liner half is formed from an elastomeric material and defines an inside surface defining at least one generally semi-cylindrical trough having a longitudinal axis, a first end, and a second end, for closely receiving a hose or cable to be clamped and an outside surface to be to be closely received by an inside surface of a clamp half. By semi-cylindrical trough is meant, in a preferred embodiment, half of a generally cylindrical inside surface. By longitudinal axis of the trough is preferably is meant the axis which is equidistant from the inside surface of the trough. The liner half has a generally semi-cylindrical outer surface with at least one tang protruding therefrom for locating the liner half in the clamp. By semi-cylindrical outer surface is meant, in a preferred embodiment, half of a generally cylindrical outside surface. The main part of the liner is preferably generally of uniform thickness. Preferably, only one tang is present. The tang is preferably generally centrally located on the semi-cylindrical outer surface and is generally plug-shaped. The tang has a generally cylindrical portion 94 positioned adjacent to the generally cylindrical outer surface and a generally frustoconical portion 96 positioned on an outer end of the generally cylindrical portion. The generally cylindrical portion of the tang preferably protrudes radially outwardly from the semi-cylindrical outer surface. An annular surface 98 connects the generally cylindrical portion and the generally frustoconical portion. The annular surface faces the generally semi-cylindrical outer surface of the liner half, so that the tang snap fits an aperture in the clamp.

Another embodiment of the invention provides a mounting structure which can be used to mount a clamp to a cylindrical object, such as a pipe. The structure comprises a base plate, a hollow post, and a pair of spaced apart walls. The base plate has a first face and a second face. The hollow post extends normally from the first face. The pair of parallel spaced apart walls extends normally from the second face. Each wall has a first end attached to the base plate and a second end spaced apart from the base plate. The second end of each wall defines an identical concave hyperbolic saddle to provide two short-line contact areas on a range of different diameter pipes. A first pair of apertures is located adjacent a first of the pair of spaced apart walls. A second pair of apertures is located adjacent a second of the pair of the spaced apart walls. A first U-bolt 99 is positioned alongside the first of the pair of spaced apart walls and received by the first pair of apertures. A second U-bolt 100 is positioned alongside the second of the pair of spaced apart walls and received by the second pair of spaced apart apertures. Preferably, the U-bolts are positioned in parallel planes normal to the axis of the clamp and the closed end of the U-bolts extends away from the axis of the clamp.

In the embodiment of the invention shown in FIGS. 10 and 11, the mounting structure further comprises an arcuate plate 89 connecting the second end of each wall. The plate has a hyperbolic cross section and defines a concave saddle for providing two-line contact on its concave inner surface for a range of different diameter pipes. To accommodate U bolts, the arcuate plate preferably further defines a first pair of apertures 91 located adjacent a first of the pair of spaced apart walls and a second pair of apertures 93 located adjacent a second of the pair of the spaced apart walls. The apertures 91 and 93, as well as the apertures in the base plate (see FIG. 11) are preferably defined by slots for the accommodation of a range of U-bolt sizes.

While certain preferred embodiments of the invention have been described herein, the invention is not to be construed as being so limited, except to the extent that such limitations are found in the claims.

What is claimed is:

1. A clamp for a tubular hose or cable, said clamp comprising
   a first clamp half having a first end and a second end and defining a concave semi-cylindrical face, the first end of the first clamp half carrying means for mounting the clamp;
   a second clamp half having a first end and a second end and defining a concave semi-cylindrical face,
   said first clamp and said second clamp coming together along a parting line,
   said first clamp half defining at least one hinge pin hole at a position between the first end and the semi-cylindrical surface,
   said second clamp half defining at least one hinge pin hole at a position near the first end,
   a hinge pin positioned through the hinge pin holes of the first clamp half and the second clamp half pivotally connecting the clamp halves so that the clamp halves come together in a face to face relationship to form a clamp assembly which defines at least one passage therethrough for clamping a cylindrical object, wherein said passage has a longitudinal axis which is parallel to a longitudinal axis of the hinge pin,
   wherein the second end of the first clamp half is defined by a first pair of spaced apart ears,
   wherein the second end of the second clamp half is defined by a second pair of spaced apart ears, said second pair of spaced apart ears being in juxtaposition with the first pair of ears when the clamp is in a closed position, and
   wherein the first end of the first clamp half forms a pair of spaced apart elbows extending generally transversely from the parting line and in a direction generally away from the second clamp half, an inner side of each of said elbows being contoured to clamp a side of a cable, and a boss extending transversely from the elbows in a direction generally along the parting line, said boss having an outer surface contoured to be received within a hollow extension leg, and the hollow extension leg mounted on the boss.

2. A clamp as in claim 1 further comprising
   a base plate having a first face and a second face,
   a hollow post extending normally from the first face,
   a pair of parallel spaced apart walls extending normally from the second face, said parallel spaced apart walls each having a first end attached to the base plate, and a second end spaced apart from the base plate,
   wherein the second end of each wall defines an identical concave hyperbolic saddle to provide two short-line contacts on a range of different diameter pipes,
   and the hollow post is mounted on the extension leg,
   so that the pair of parallel spaced apart walls are normal to the longitudinal axis of the semi-cylindrical trough.

3. A clamp as in claim 2 wherein the hollow post defines a pair of aligned apertures which are aligned with the pair of apertures through the hollow extension leg, said clamp further comprising a pin positioned through the aligned apertures to retain the hollow post in position on the extension leg.

* * * * *